(12) United States Patent
Sun et al.

(10) Patent No.: US 11,219,909 B2
(45) Date of Patent: Jan. 11, 2022

(54) FLUID PRODUCT DISPENSER

(71) Applicant: APTAR FRANCE SAS, Le Neubourg (FR)

(72) Inventors: Tyler Sun, Jiangsu (CN); Raul Ye, Jiangsu (CN)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 16/754,507

(22) PCT Filed: Oct. 9, 2018

(86) PCT No.: PCT/FR2018/052490
§ 371 (c)(1),
(2) Date: Apr. 8, 2020

(87) PCT Pub. No.: WO2019/073163
PCT Pub. Date: Apr. 18, 2019

(65) Prior Publication Data
US 2020/0269264 A1  Aug. 27, 2020

(30) Foreign Application Priority Data
Oct. 12, 2017 (CN) .......................... 201710943980.2

(51) Int. Cl.
*B05B 11/00* (2006.01)
*B01L 3/02* (2006.01)
*G01F 11/02* (2006.01)

(52) U.S. Cl.
CPC ........ *B05B 11/0013* (2013.01); *B01L 3/0265* (2013.01); *B05B 11/0035* (2013.01);
(Continued)

(58) Field of Classification Search
CPC .. B01L 2200/04; B01L 3/0265; B01L 3/0272; B05B 11/0013; B05B 11/0035;
(Continued)

(56) References Cited

U.S. PATENT DOCUMENTS 4,068,974 A * 1/1978 Meyer .................. F04B 53/128
401/150
10,040,084 B2 * 8/2018 Duquet ............... B05B 11/3015
(Continued)

FOREIGN PATENT DOCUMENTS

DE 37 11 236 A1 8/1987
JP 10-179739 A 7/1998
(Continued)

OTHER PUBLICATIONS

International Preliminary Report on Patentability dated Apr. 16, 2020 in International Application No. PCT/FR2018/052490.
(Continued)

*Primary Examiner* — Vishal Pancholi
*Assistant Examiner* — Bob Zadeh
(74) *Attorney, Agent, or Firm* — Sughrue Mion, PLLC

(57) ABSTRACT

A fluid dispenser having a casing (E) provided with a dispenser head (11); and a refill cartridge (C) that includes a fluid reservoir (R). The refill cartridge (C) is axially insertable into the casing (E) in such a manner as to connect the fluid reservoir (R) to the dispenser head (11). The refill cartridge (C) and the casing (E) are provided with a connection mechanism (17, 253) that connects the refill cartridge (C) in the casing (E) by screw-fastening, so as to bring the fluid reservoir (R) into leaktight contact with the dispenser head (11). The movement, after screw-fastening, of the refill cartridge (C) in the casing (E) towards the dispenser head (11) delivers the fluid to the dispenser head (11).

10 Claims, 2 Drawing Sheets

(52) U.S. Cl.
CPC .... *B05B 11/0054* (2013.01); *B05B 11/00416*
(2018.08); *B05B 11/3004* (2013.01); *B05B*
*11/3015* (2013.01); *B05B 11/3074* (2013.01);
*B05B 11/3092* (2013.01); *G01F 11/027*
(2013.01); *B01L 2200/04* (2013.01); *B05B*
*11/3094* (2013.01)

(58) Field of Classification Search
CPC .......... B05B 11/0037; B05B 11/00416; B05B
11/0054; B05B 11/0059; B05B 11/3004;
B05B 11/3015; B05B 11/3074; B05B
11/309; B05B 11/3092; B05B 11/3094;
G01F 11/027; A45D 2040/208; A45D
40/205; A45D 2040/207; A45D 40/06
See application file for complete search history.

(56) References Cited

U.S. PATENT DOCUMENTS

| | | | |
|---|---|---|---|
| 2007/0068967 A1* | 3/2007 | Kee | B05B 11/3004 |
| | | | 222/162 |
| 2013/0068797 A1* | 3/2013 | Laidler | B05B 11/00412 |
| | | | 222/321.1 |
| 2016/0279653 A1* | 9/2016 | Brugger | B05B 11/3015 |
| 2020/0269264 A1* | 8/2020 | Sun | B05B 11/0059 |

FOREIGN PATENT DOCUMENTS

| | | |
|---|---|---|
| WO | 03/103760 A1 | 12/2003 |
| WO | 2008/072823 A1 | 6/2008 |

OTHER PUBLICATIONS

International Search Report for PCT/FR2018/052490 dated Feb. 12, 2019 [PCT/ISA/210].

* cited by examiner

FLUID PRODUCT DISPENSER

CROSS REFERENCE TO RELATED APPLICATIONS

This application is a National Stage of International Application No. PCT/FR2018/052490 filed Oct. 9, 2018, claiming priority based on Chinese Patent Application No. 201710943980.2 filed Oct. 12, 2017.

FIELD OF THE INVENTION

The present invention relates to a fluid dispenser comprising a fluid reservoir and a conventional manual pump that defines a variable-volume pump chamber between a pump body and an actuator rod. The purpose of moving the actuator rod is to vary the volume of the pump chamber that, in the rest position, defines a predetermined maximum volume. This type of dispenser is very frequently used in the fields of perfumery, cosmetics, and pharmacy for dispensing fluids of various viscosities.

BACKGROUND

In the prior art, document FR 2 978 431 is also known, which describes a fluid dispenser including a fluid reservoir, and a pump including a pump body and an actuator rod defining between them a pump chamber having a predetermined maximum volume. The rod is axially movable in the body so as to cause the volume of the pump chamber to vary. The dispenser further includes a dispenser cannula that is mounted on the actuator rod and that includes a dispenser outlet that is suitable for forming a drop of fluid that separates from the cannula by gravity. The predetermined maximum volume of the pump chamber is substantially equal to the volume of the drop of fluid that is dispensed at the dispenser head.

CERTAIN OBJECTS AND EMBODIMENTS OF THE INVENTION

The present invention seeks in particular to optimize that fluid dispenser of the prior art, and also others, by making them refillable, so that the user can preserve a portion of the dispenser and purchase refill cartridges. Specifically, an object of the present invention is to make it easy to put the refill cartridges into place by manipulation that is easy, intuitive, ergonomic, and repeatable, while guaranteeing good cleanliness (no loss of drops).

To do this, the present invention proposes a fluid dispenser comprising:
a casing that is provided with a dispenser head; and
a refill cartridge that includes a fluid reservoir;
wherein the refill cartridge is axially insertable into the casing in such a manner as to connect the fluid reservoir to the dispenser head; the refill cartridge and the casing being provided with connection means for connecting the refill cartridge in the casing by screw-fastening, so as to bring the fluid reservoir into leaktight contact with the dispenser head, the movement, after screw-fastening, of the refill cartridge in the casing towards the dispenser head delivering the fluid to the dispenser head. Thus, it is the screw-fastening that makes it possible to move the refill cartridge so as to create a leaktight connection, before actuating the dispenser. Sealing may equally well be axial or radial, or both simultaneously.

Advantageously, the refill cartridge includes a rotary actuator ring that is guided in axial sliding over the fluid reservoir, but that turns the refill cartridge in the casing so as to perform screw-fastening. Preferably, the rotary actuator ring is snap-fastened in removable manner on the fluid reservoir, turning about its own axis over an angular stroke that is limited by the connection means. In practice, the user takes hold of the casing via its rotary actuator ring and begins by inserting the fluid reservoir into the casing until the connection means come into mutual engagement. The user thus presses on the ring so as to snap-fasten it on the casing. In this way, the connection means are in a configuration that enables the user to impart a turning movement on the rotary actuator ring, which then drives the fluid reservoir so that it becomes screw-fastened on or in the casing. Once the screw-fastening operation has terminated, the user can press on the reservoir so as to move it towards the dispenser head and thus dispense fluid through the head, in the form of a drop, a spray, a thread, or a glob.

Advantageously, the connection means comprise at least one cam path that is formed by the casing, and at least one pin that is formed by the fluid reservoir, the pin being engaged in the cam path and following the cam path while turning the rotary actuator ring. In an advantageous embodiment, the cam path may be in the form of a slot that passes through the wall thickness of the casing, the pin passing through the slot and including a free end that is engaged in an axial guide groove that is formed inside the rotary actuator ring. Preferably, the slot includes an access opening via which the pin penetrates into an initial axial slot portion, before the rotary actuator ring snap-fastens on the casing, the pin, after snap-fastening the rotary actuator ring on the casing, then following its path into a sloping slot portion as the rotary actuator ring turns on the casing, until it reaches a final axial slot portion, in which the pin can move axially by pressing on the fluid reservoir so as to dispense fluid through the dispenser head.

In another practical aspect, the fluid reservoir may include a cylinder and a pushbutton that is fastened to the cylinder, advantageously by snap-fastening, the pushbutton forming said at least one pin and a bearing surface so as to move the refill cartridge axially in the casing and thus dispense fluid through the dispenser head. In a variant, the pushbutton may be made integrally with the casing.

Advantageously, the cylinder includes a follower piston that moves as the fluid is removed from the reservoir. A flexible pouch could also be used.

In a practical embodiment, the refill cartridge may include a pump that is associated with the fluid reservoir, the pump being connected in leaktight manner to the dispenser head via the connection means. More precisely, the dispenser head may include a connection sleeve, and the pump includes a valve rod that is engaged in the connection sleeve thereby establishing radial sealing.

In an advantageous application, the dispenser head may include a dispenser cannula that is suitable for forming a drop of fluid that separates from the cannula by gravity.

One of the principles of the invention resides in the fact that the leaktight connection of the refill cartridge in the casing is performed by a screw-fastening movement presenting an axial component that is used to establish sealing. The use of a rotary actuator ring makes it possible to facilitate the screw-fastening operation which is barely perceptible to the user, who merely turns the ring, which then drives the reservoir in a screw-fastening movement (comprising both rotary and axial components).

BRIEF DESCRIPTION OF THE DRAWINGS

The present invention is described more fully below with reference to the accompanying drawings, which show an embodiment of the present invention by way of non-limiting example.

In the figures.

DETAILED DESCRIPTION OF NON-LIMITING EMBODIMENTS

Figure 1:
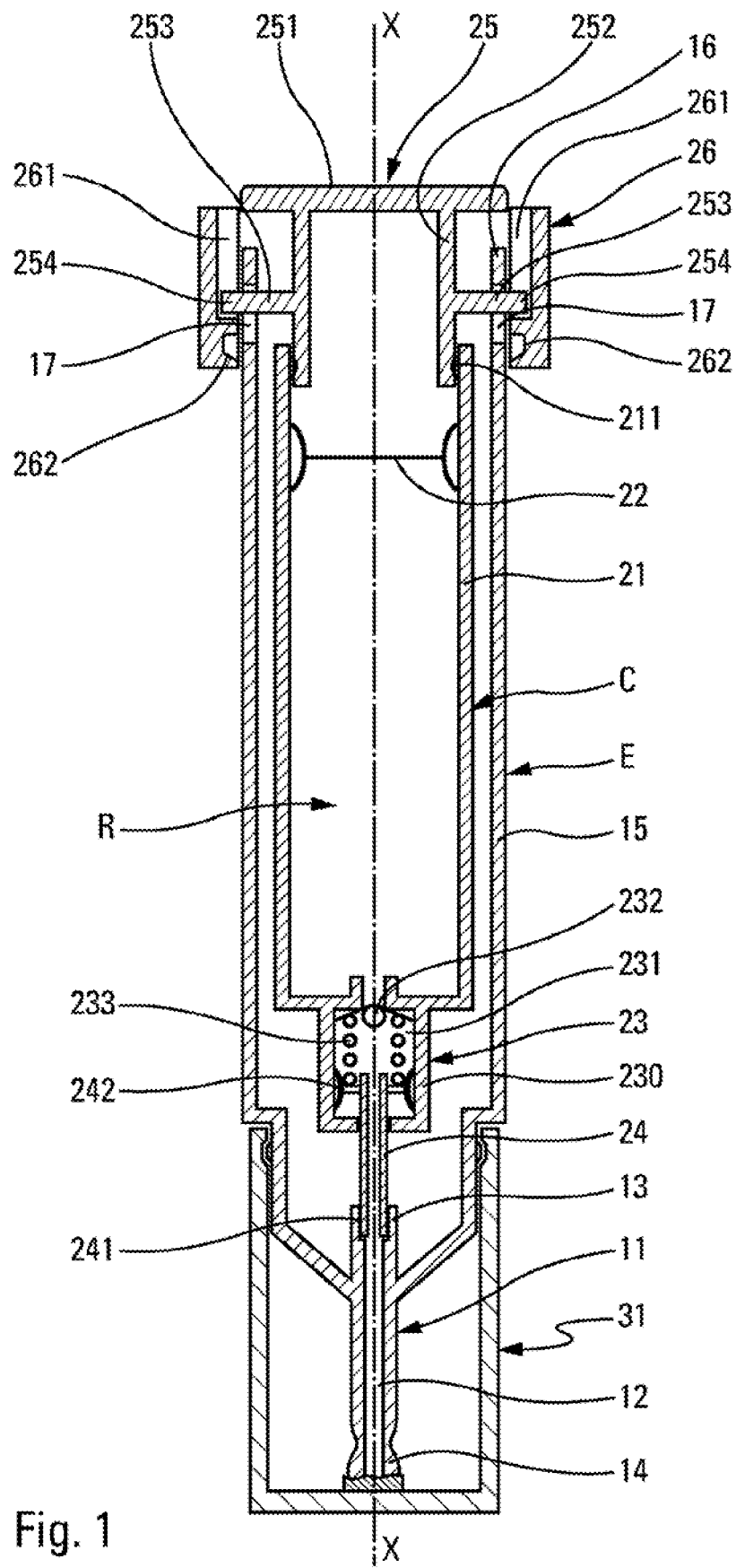
FIG. 1 is a vertical section view through a fluid dispenser of the invention.

The dispenser shown in the figures comprises two distinct sub-assemblies, namely: a casing E and a refill cartridge C. A protective cap 31 may also be provided, which cap is mounted on the casing E.

The casing E is a hollow shell in which the refill cartridge C is housed. The casing E includes a main body 15 that is circularly cylindrical in shape in this embodiment. Other shapes are possible. The main body 15 includes an open top end 16, and a bottom end that is extended by a dispenser head 11 that forms a cannula 12. In this embodiment, the casing E and the cannula 12 are made as a single piece. The dispenser cannula 12 may be made out of a transparent material, such as glass or a plastics material, for example. The cannula 12 may present perfect circular symmetry around a longitudinal axis X. The cannula 12 extends from a connection sleeve 13 to a dispenser outlet 14 that is suitable for forming a drop of fluid that separates from the cannula by gravity. The volume of the dispensed drops lies in the range about 50 microliters (μL) to about 70 μL. The dispenser cannula 12 presents a generally elongate configuration, similar to a conventional pipette.

Figure 2:
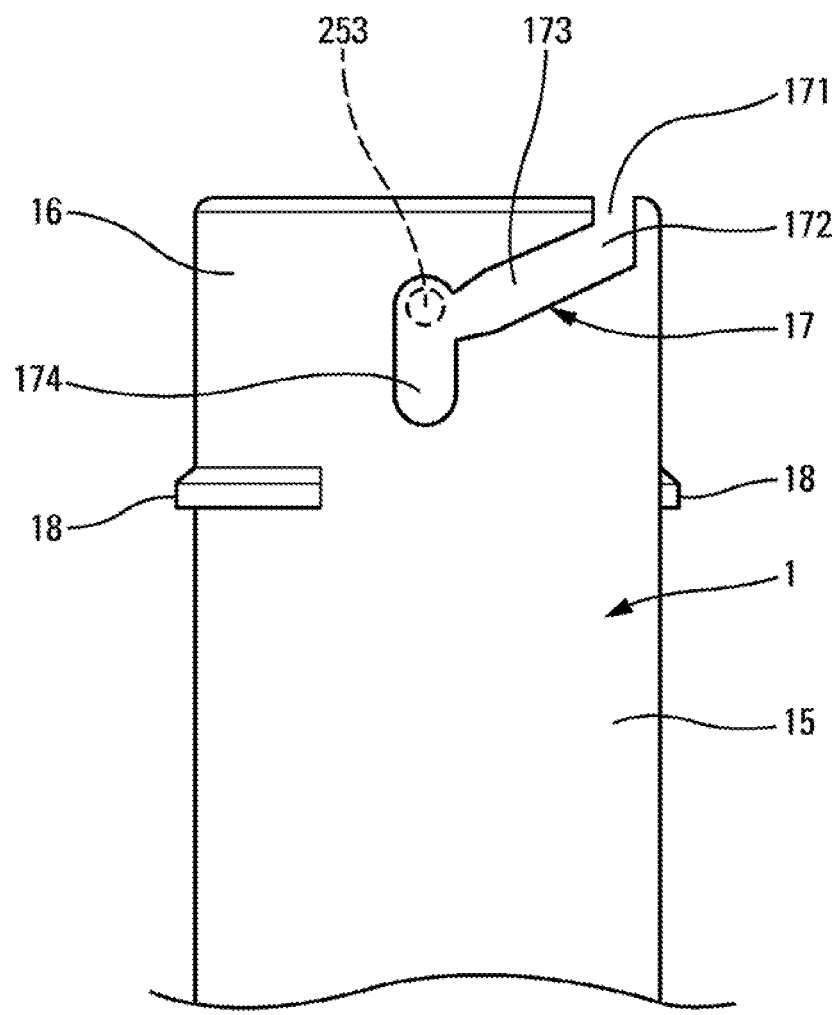
FIG. 2 is a larger-scale view of the top portion of the FIG. 1 casing.

In the invention, and with reference to FIG. 2, it can be seen that the open top end 16 of the casing E is formed with at least one cam path that is in the form of a cam slot 17 that passes through the wall thickness of the casing. The cam slot 17 defines an access opening 171 that starts from the top annular edge of the casing, an initial axial slot portion 172, a sloping slot portion 173, and a final axial slot portion 174 of oblong shape. In practice, it is preferable to provide at least two cam slots 17. In addition, the open top end 16 of the casing E is formed with at least one snap-fastener rib 18, and preferably with two snap-fastener ribs, that extend as peripheral sectors, projecting outwards. The snap-fastener ribs 18 are situated level with the final axial slot portion 174.

The refill cartridge C comprises a fluid reservoir R, a pushbutton 25, and a rotary actuator ring 26.

The fluid reservoir R includes a cylindrical slide cylinder 21 inside which a follower piston 22 is slidably mounted. This constitutes a reservoir of capacity that varies as the follower piston 22 is moved inside the slide cylinder 21. With this type of reservoir, the fluid contained in the reservoir R is always protected from the outside air, and thus cannot deteriorate.

The pushbutton 25 is arranged at the end of the slide cylinder 21, just above the follower piston 12, when the reservoir is full of fluid. The pushbutton 25 forms a bushing 252 that is secured to the cylinder 21, e.g. by permanent snap-fastening 211. In a variant, the pusher 2 may be adhesively-bonded, heat-sealed, or force-fitted in the cylinder 21. The pushbutton 25 defines a bearing surface on which the user can press, e.g. by means of a thumb. Thus, by pressing on the pushbutton 25, pressure is exerted on the reservoir R, as described below.

In the invention, the pushbutton 25 forms at least one pin 253 projecting outwards from the bushing 252, and preferably two pins that extend in diametrically-opposite manner. The pins 253 define free ends 254. The pins 253 are for engaging in the cam slots 17 of the casing E, as described below.

The refill cartridge C also includes a pump 23 that can be considered as an accessory of the reservoir R. The pump 3 conventionally includes a pump body 230 that internally forms a pump chamber 231 of variable capacity, but defining a predetermined maximum volume in its rest position. The pump is defined by the pump body 230, and also by an actuator rod 24 that is provided with a piston 242. The pump 23 is also provided with an inlet valve 232, and with a pump outlet valve that may be incorporated in the actuator rod 24, or that may be secured thereto. Thus, by pressing on the actuator rod 24, the volume of the pump chamber 231 varies starting from its maximum volume that may lie in the range about 50 μL to about 70 μL. The actuator rod 24 is movable from its rest position, against a return spring 233 that is situated outside the pump chamber. The dose of fluid that is dispensed corresponds substantially to the determined maximum volume of the pump chamber. In other words, on each actuation, the pump dispenses substantially all of the fluid that is present in the pump chamber. The spring 233 thus returns the pump chamber 231 into its predetermined maximum-volume configuration. This is an entirely conventional design for a manual pump in the fields of perfumery, cosmetics, and pharmacy.

In addition, the internal volume of the cannula 12 corresponds to about 3 to 7 times, and preferably 4 to 6 times, the maximum volume of the pump chamber 231 that lies in the range about 50 μL to about 70 μL. In other words, the internal volume of the cannula lies in the range about 150 μL to about 500 μL. Preferably, the internal volume lies in the range about 200 μL to about 400 μL, and is preferably 300 μL. Thus, the content of the pump chamber 231, that is driven under pressure through the actuator rod 24, arrives in the cannula 12 that is already full of fluid. The considerably-greater volume of the cannula relative to the dose that is dispensed makes it possible to create considerable head loss in the cannula, thereby making it possible to avoid fluid being dispensed in the form of spray. The fluid is thus damped in the cannula prior to being detached therefrom by gravity in the form of a drop having a capacity that lies in the range about 50 μL to about 70 μL.

In the invention, the rotary actuator ring 26 of the refill cartridge C includes at least one, and preferably two, axial guide grooves 261 that extend vertically or axially inside the ring 26. The grooves 261 are open upwards and closed downwards. In addition, the rotary actuator ring 26 also forms an annular snap-fastener groove 262 that may extend in continuous manner over the entire outer periphery of the casing, or merely over sectors that may be interposed between the grooves 261.

In FIG. 1, it should be observed that the bushing 252 of the pushbutton 25 extends coaxially inside the casing E, which itself extends coaxially inside the rotary actuator ring 26. The two pins 253 pass through the two cam slots 17 of the casing, in the position indicated by dashed lines in FIG. 2. The free ends 254 of the pins 253 are engaged in the two axial guide grooves 261 of the rotary actuator ring 26, the annular snap-fastener grooves 262 of which are in releasable snap-fastening engagement with the snap-fastening ribs 18 of the casing E. In this operational position for dispensing, a user can grip the dispenser in the palm of one hand via the casing E, and press on the pushbutton 25 by means of the thumb. Actuation is thus similar to the actuation of a conventional pipette. Given that the casing E masks the reservoir R (and its pump 23) completely, the user is not even conscious of actuating a pump by pressing on the pushbutton 25. The user merely observes that by pressing on the pusher 25, a well-formed drop of fluid falls by gravity from the end of the outlet 14 of the cannula 12.

In order to get to this operational position for dispensing, the user must firstly take hold of a refill cartridge C with one hand, and the casing E with the other hand. The free ends 254 of the pins 253 are already engaged in the two axial guide grooves 261 of the rotary actuator ring 26, which can thus slide axially around the pushbutton 25. The user then inserts the reservoir R (with its pump 23) in the casing E until the pins 253 come into contact with the top edge of the casing E. The user then takes hold of the refill cartridge C by the rotary actuator ring 26 and turns it until the pins 253 engage in the access openings 171 of the cam slots 17. At this moment, the user feels an axial hard point that can be overcome, thereby snap-fastening the annular groove 262 around the snap-fastener ribs 18 of the casing E. In this way, the pins 253 are moved axially so as to reach the bottoms of the initial axial slot portions 172. Starting from this configuration, the user turns the rotary actuator ring 26 about its own axis, and this forces the pins 253 that are engaged in the axial guide grooves 261 to follow the sloping slot portions 173, thereby moving the reservoir and the pushbutton axially towards the dispenser head 11. In this way, the free end 241 of the valve rod 24 is engaged in the connection sleeve 13 of the dispenser head 11, establishing axial, or preferably radial, leaktight contact. Once the rotary actuator ring 26 is fully turned, the pins 253 are situated in the final axial slot portions 174 of oblong shape, as shown in FIG. 2 by dashed lines. The dispenser can then be used in the manner described above by pressing on the pushbutton 25 in order to dispense a drop of fluid.

It can clearly be understood that the pins 253 and the cam slots 17 co-operate with each other to form connection means that act by screw-fastening, which connection means enable the refill cartridge to be connected in leaktight manner to the dispenser head 11 of the casing E. The rotary actuator ring 26 ingeniously complements the screw-fastening connection means, by improving grip on the refill cartridge C, by making it easier for the refill cartridge C to be angularly oriented relative to the casing E so as to find the access opening 171, by becoming snap-fastened in releasable and rotary manner on the casing E, by transforming the (axial and rotary) screw-fastening movement into a movement that is purely rotary, and by masking or covering the pushbutton 25. These functions are all implemented in the embodiment that is used to illustrate the present invention, but it is clear that the rotary actuator ring 26 could perform only a portion of the functions listed above.

Without going beyond the ambit of the invention, the pump may also form an integral part of the casing, and the dispenser head 11 need not have a dispenser cannula 12 as described above. The dispenser head 11 could incorporate a nozzle so as to form a spray, or it may be provided with an applicator.

The invention claimed is:

1. A fluid dispenser comprising:
a casing that is provided with a dispenser head; and
a refill cartridge that includes a fluid reservoir;
wherein the refill cartridge is axially insertable into the casing in such a manner as to connect the fluid reservoir to the dispenser head;
wherein the refill cartridge and the casing are provided with connection means for connecting the refill cartridge in the casing by screw-fastening, so as to bring the fluid reservoir into leaktight contact with the dispenser head, the movement, after screw-fastening, of the refill cartridge in the casing towards the dispenser head delivering fluid from the fluid reservoir to the dispenser head;
wherein the connection means comprises:
at least one cam path formed by the casing,
a rotary actuator ring mounted on the casing, and
at least one pin formed by the fluid reservoir, so that the pin engages in the cam path and follows the cam path while turning the rotary actuator ring.

2. A dispenser according to claim 1, wherein the cam path is in the form of a cam slot that passes through a wall thickness of the casing, the pin passing through the cam slot and including a free end that is engaged in an axial guide groove that is formed inside the rotary actuator ring.

3. A dispenser according to claim 2, wherein the cam slot includes an access opening via which the pin penetrates into an initial axial slot portion, before the rotary actuator ring snap-fastens on the casing, the pin, after snap-fastening the rotary actuator ring on the casing, then following its path into a sloping slot portion as the rotary actuator ring turns on the casing, until it reaches a final axial slot portion, in which the pin can move axially by pressing on the fluid reservoir so as to dispense fluid through the dispenser head.

4. A dispenser according to claim 1, wherein the fluid reservoir includes a cylinder and a pushbutton that is fastened to the cylinder, the pushbutton forming said at least one pin and a bearing surface so as to move the refill cartridge axially in the casing and thus dispense fluid through the dispenser head.

5. A dispenser according to claim 4, wherein the cylinder includes a follower piston that moves as the fluid is removed from the fluid reservoir.

6. A dispenser according to claim 4, wherein the pushbutton is fastened to the cylinder by snap-fastening.

7. A dispenser according to claim 1, wherein the refill cartridge includes a pump that is associated with the fluid reservoir, the pump being connected in leaktight manner to the dispenser head via the connection means.

8. A dispenser according to claim 7, wherein the dispenser head includes a connection sleeve, and the pump includes a valve rod that is engaged in the connection sleeve thereby establishing radial sealing.

9. A dispenser according to claim 1, wherein the dispenser head includes a dispenser cannula that is configured to form a drop of fluid that separates from the dispenser cannula by gravity.

10. A fluid dispenser comprising:
a casing that is provided with a dispenser head; and
a refill cartridge that includes a fluid reservoir;
wherein the refill cartridge is axially insertable into the casing in such a manner as to connect the fluid reservoir to the dispenser head;
the refill cartridge and the casing comprising connection means for connecting the refill cartridge in the casing by screw-fastening, so as to bring the fluid reservoir into leak tight contact with the dispenser head, movement, after screw-fastening, of the refill cartridge in the casing towards the dispenser head delivering fluid from the fluid reservoir to the dispenser head, wherein a rotary actuator ring is snap-fastened in removable manner on the fluid reservoir turning about an axis of the rotary actuator ring over an angular stroke that is limited by the connection means.

* * * * *